(12) United States Patent
Stoschek

(10) Patent No.: US 6,672,671 B1
(45) Date of Patent: Jan. 6, 2004

(54) PADDING SYSTEM

(75) Inventor: Olaf Stoschek, Kronach (DE)

(73) Assignee: Johnson Controls Technology Company, Plymouth, MI (US)

( * ) Notice: Subject to any disclaimer, the term of this patent is extended or adjusted under 35 U.S.C. 154(b) by 253 days.

(21) Appl. No.: 09/716,179

(22) Filed: Nov. 17, 2000

(30) Foreign Application Priority Data

Nov. 17, 1999 (DE) .......................................... 199 55 159

(51) Int. Cl.[7] .................................................. A47C 7/02
(52) U.S. Cl. ............................ 297/452.57; 297/DIG. 1; 297/452.48
(58) Field of Search ....................... 297/DIG. 1, DIG. 2, 297/452.48, 452, 57, 452.62, 452.59

(56) References Cited

U.S. PATENT DOCUMENTS

| | | | | |
|---|---|---|---|---|
| 3,174,164 A | * | 3/1965 | Reed ..................... | 297/452.48 |
| 3,961,001 A | * | 6/1976 | Bethe ....................... | 264/236 |
| 4,699,427 A | * | 10/1987 | Kobayashi ............. | 297/452.27 |
| 4,848,843 A | * | 7/1989 | Gibbs ........................ | 248/188 |
| 5,016,941 A | * | 5/1991 | Yokota ................... | 297/452.61 |
| 5,058,955 A | * | 10/1991 | Sugiura et al. ............. | 264/46.6 |
| 5,388,891 A | * | 2/1995 | Oka et al. .............. | 297/452.27 |
| 5,468,041 A | | 11/1995 | Viertel et al. | |
| 5,723,197 A | | 3/1998 | Grund et al. | |
| 5,759,324 A | * | 6/1998 | Roth et al. .................. | 156/152 |
| 5,762,403 A | * | 6/1998 | Robinson ............... | 297/440.11 |
| 5,788,332 A | * | 8/1998 | Hettinga ................. | 297/452.55 |
| 5,833,313 A | * | 11/1998 | Kaneda et al. ........... | 297/218.1 |
| 5,857,749 A | * | 1/1999 | DeBellis et al. ....... | 297/452.25 |
| 5,944,389 A | * | 8/1999 | Zenba et al. .................. | 156/78 |
| 6,056,479 A | * | 5/2000 | Stevenson et al. ...... | 405/129.75 |

FOREIGN PATENT DOCUMENTS

| | | |
|---|---|---|
| DE | 44 46 450 | 4/1996 |
| DE | 196 36 814 | 3/1998 |
| EP | 1 101 589 | 5/2001 |
| GB | 1 439 739 | 6/1976 |
| GB | 2 053 774 | 2/1981 |
| JP | 58-203026 | 11/1983 |

* cited by examiner

*Primary Examiner*—Peter M. Cuomo
*Assistant Examiner*—Stephanie Harris
(74) *Attorney, Agent, or Firm*—Foley & Lardner

(57) ABSTRACT

A padding system for use in a vehicle is disclosed. The system includes a seat providing a pad comprising foam and having a border area. The system may also include at least one reinforcing section embedded in the border area of the foam. A method of manufacturing a padding element for use in a vehicle seat is also disclosed. The seat may include a reinforcement, a carrier at least partially surrounding the reinforcement, and a foam at least partially surrounding the carrier. The method may include foaming the reinforcement in a foaming mold. The method may also include clamping the reinforcement to at least one fastening bracket in the foaming mold. A mold for manufacturing a padding element for use in a vehicle is also disclosed. The mold may include a foaming mold comprising a sidewall and a bottom. The mold may also include at least one clamp in the mold.

27 Claims, 3 Drawing Sheets

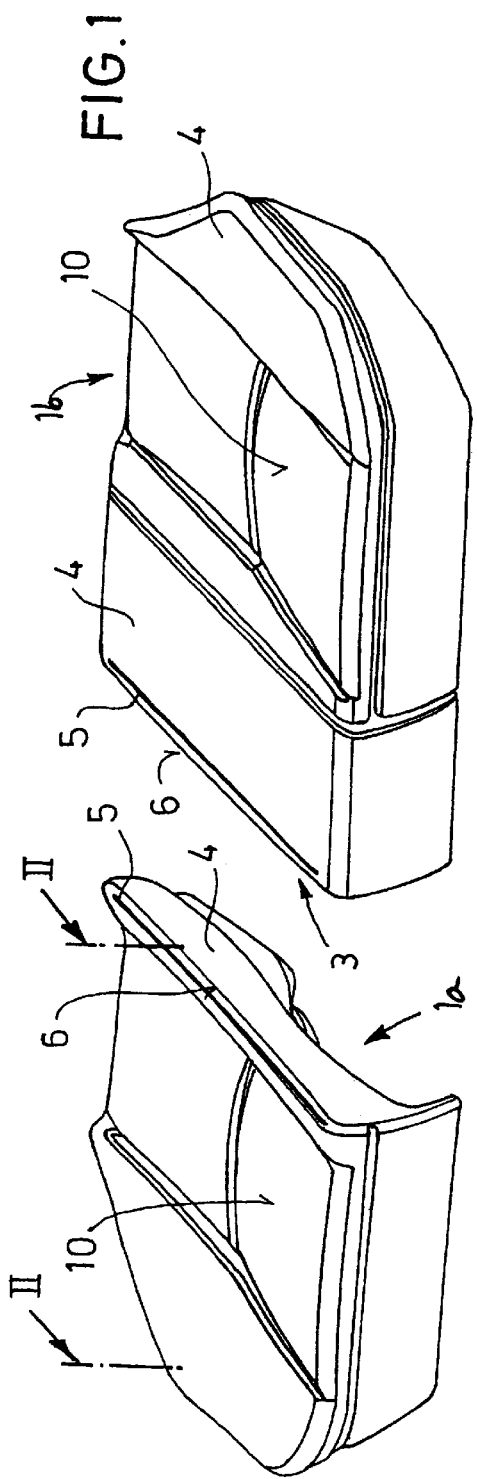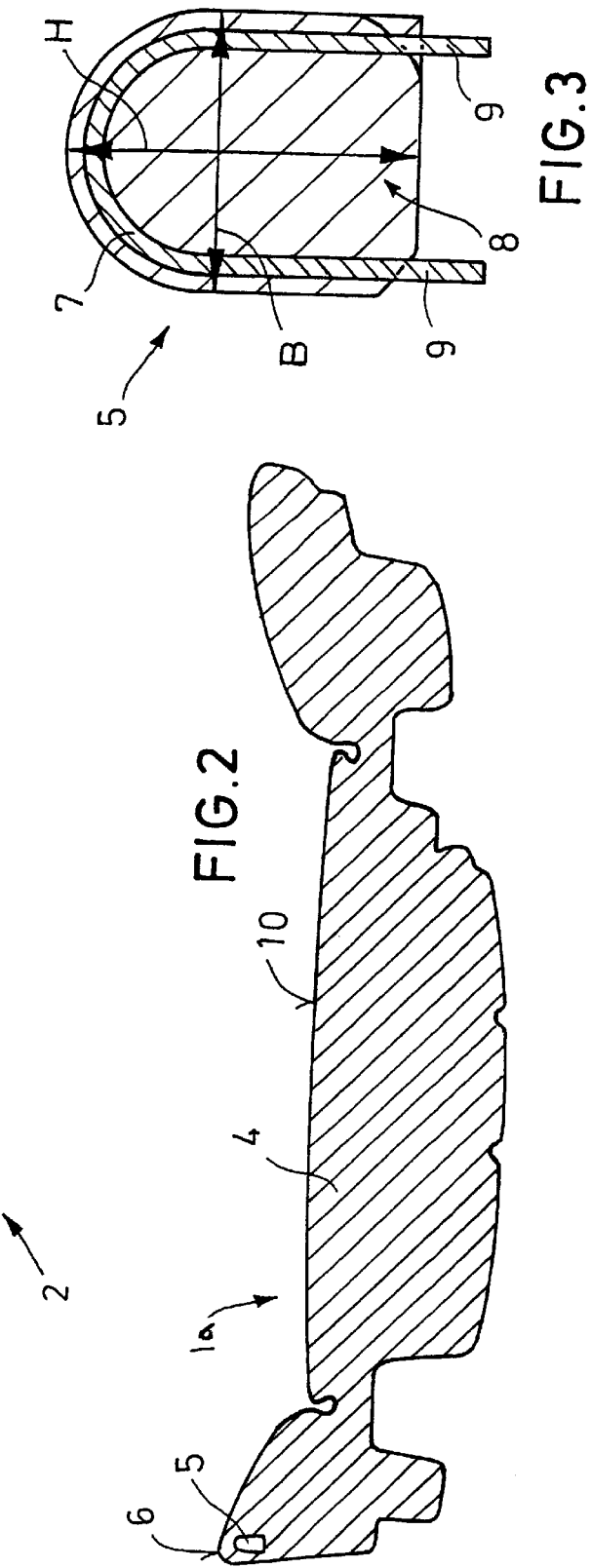

PADDING SYSTEM

FIELD

The present invention relates to a padding system and method. More specifically, the present invention relates to a padding element, which may include a foam element and which may be used for a motor vehicle seat. More specifically, the present invention relates to a mold form tool and method, which may be suited for the production of the padding element.

CROSS-REFERENCE TO RELATED APPLICATIONS

This application claims priority under 35 U.S.C. §119 of German Patent Application No. 199 55 159.6 filed on Nov. 17, 1999, the entire disclosure of which is incorporated by reference.

BACKGROUND

It is well known to collapse one seat section (and associated seat back) of a rear vehicle seat to create a larger storage space. A passenger may occupy the remainder of the other seat (i.e., the un-collapsed seat section). The un-collapsed seat section may lose its support stability due to the collapsed seat section. This can lead to a deformation of the seat pad of the un-collapsed seat section, which may be detrimental to the comfort of the seated passenger.

A padding or foam element of a seat pad for providing passenger comfort (e.g., seat backs, armrests, headrests) having polyurethane flexible foam is generally known. Such padding element may allow for cushioning of vibrations and suitable shaping of such seat pad (in accordance with human anatomy requirements). Such known padding element typically has a bulk density in the range about 45 to 55 kg/m$^3$, which is generally regarded as a guideline for relatively good padding of a motor vehicle seat made of polyurethane flexible foam. It is also known to embed a mounting device in a foam part as shown in U.S. Pat. No. 5,723,197.

It is also known to manufacture polyurethane foam by polycondensation or mixing polyols (e.g., polyether, polyester) and isocyanates. The mixture may react (depending on the reactivity of the starting materials) within several minutes when it is put into a mold, either with or without external heat supply. It might be necessary to heat the foam in the mold to complete the cross linkage. Taking into consideration these two methods, cold foam (CF) may be distinguished from hot foam (HF) or HR (high resilient) foam. HR foam is manufactured mainly as block foam. The resiliency curve of HR foam is comparable to that of latex foam. Since, however, the permanent set of latex foam is generally less advantageous, such latex foam is mainly used for leather upholstered furniture.

Hot foam has the advantage that a comparatively low relative density (bulk density) can be achieved, and foam with a bulk density of approximately 32 kg/m$^3$ may be produced. Such hot foam has suitable cushioning characteristics and is used mainly for rear seats in automobiles. A flexible insert can be incorporated into such rear seats. However, there are disadvantages that may occur during a prolonged use of hot foam in the rear seats (e.g., "tired" foam). Such hot foam may develop only minimal restoring forces after a deformation, and may have a relatively high permanent set. Further, when hot foam is manufactured in a mold, its surface is completely sealed by a skin, which makes the circulation of the air in the padding element to be produced difficult. It is a further disadvantage that such hot foam method is characterized by comparatively large energy consumption. (Hot foam molds are typically designed in such a fashion that the inside air can escape relatively quickly through openings in the walls of the mold. During its production, such hot foam rises slowly in the mold.)

Cold foam can provide a generally pronounced padding effect, a slight decrease of the performance capability, and relatively good air permeability. The relatively high enthalpy produced by the source materials during a cold foam reaction allows for a production of the foam without any relatively large energy supply. The molds for cold foaming are typically tightly sealed,.so that relatively no air can escape and a relatively constant internal pressure may be maintained. Closed pores created in the cold foam must be opened after the foaming process. However, problems can occur during the embedding of inserts into cold foams. In particular, the foaming of "air absorptive" inserts is problematic, because air pockets are created close to edges of the inserts, which requires post processing.

Accordingly, there is a need for a pad for supporting and cushioning a user or passenger. There is also a need for a pad that has a relatively high dimensional stability.

There is also a need for a pad that provides a relatively high degree of comfort for a user. Thus, it would be advantageous to provide a padding system and method having features that fulfill one or more of these needs. These and other features will become apparent to one of skill who reviews this disclosure and appended claims.

SUMMARY

An exemplary embodiment of the present invention relates to a padding system for use in a vehicle. The system may include a seat providing a pad comprising a foam and having a border area. The system may also include at least one reinforcing section embedded in the border area of the foam.

Another exemplary embodiment of the present invention relates to a method of manufacturing a padding element for use in a vehicle seat. The seat may include a reinforcement, a carrier at least partially surrounding the reinforcement, and a foam at least partially surrounding the carrier. The method may include foaming the reinforcement in a foaming mold. The method may also include clamping the reinforcement to at least one fastening bracket in the foaming mold.

Another exemplary embodiment of the present invention relates to a mold for manufacturing a padding element for use in a vehicle. The mold may include a foaming mold comprising a sidewall and a bottom. The mold may also include at least one clamp in the mold.

BRIEF DESCRIPTION OF THE DRAWINGS

FIG. 1 is a perspective view of padding elements for a vehicle seat according to an exemplary embodiment of the present invention.

FIG. 2 is a cross-sectional view of the padding element of FIG. 1 taken along line II—II of FIG. 1.

FIG. 3 is a sectional view of a reinforcing section shown in FIG. 2.

DETAILED DESCRIPTION OF PREFERRED AND OTHER EXEMPLARY EMBODIMENTS

Figure 4:
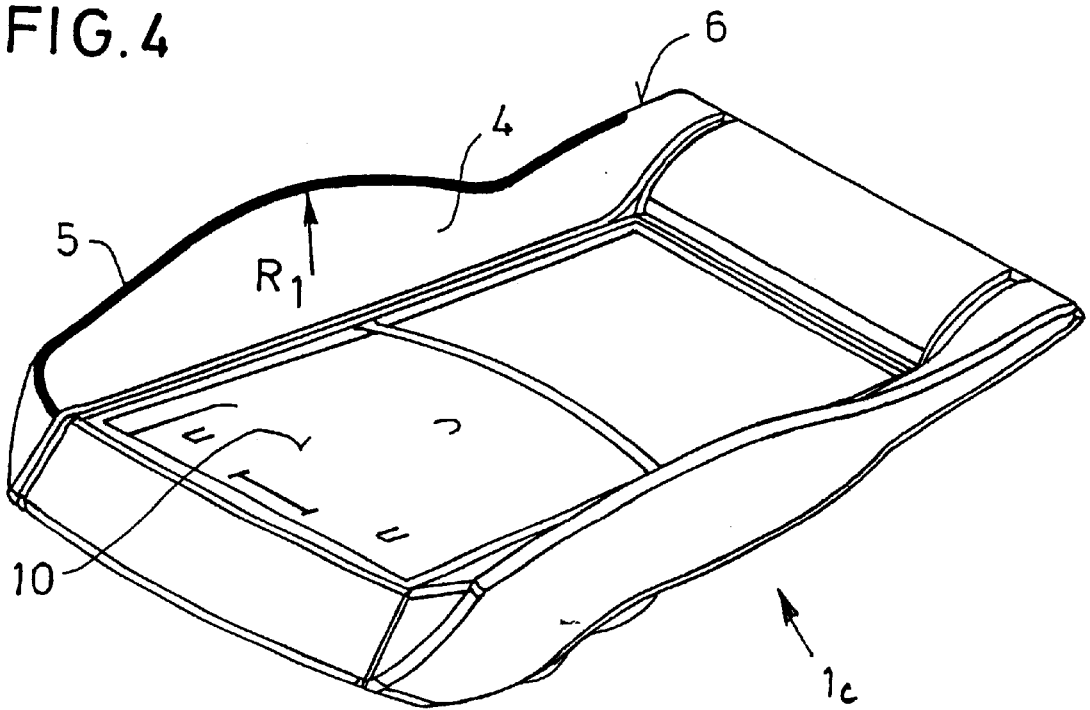
FIG. 4 is a perspective view of a padding element according to an alternative embodiment of the present invention.

FIG. 1 shows a foam or cushion element (shown as a left seat element 1a and a right seat element 1b) having a padding element (shown as a pad 3) and a foam element or piece 4. Pad 3 may be a component of a back or rear seat 2 of a vehicle as shown in FIG. 1, and may be a component of an article of furniture (e.g., for supporting sitting or lying) according to an alternative embodiment. Pad 3 may provide cushioning qualities, a relatively high dimensional stability, a relatively high degree of comfort for a user, a relatively high restoring capability, and a minimal long-term fatigue due to a relatively high elasticity.

Referring to FIG. 1, pad 3 is shown nested between seat elements 1a and 1b of rear seat 2. Pad 3 may be folded out from the position shown in FIG. 1 and positioned in a seating plane. Pad 3 may also be removed completely from rear seat 2 such that a resulting space is left open in the seat plane between seat 1a and seat 1b.

Foam piece 4 may be placed in a border area (e.g., a relatively convex outside border or edge 6 as shown in. FIG. 1) of pad 3. According to a suitable embodiment, foam piece 4 may be made of polyurethane flexible foam. According to a preferred embodiment, foam piece 4 may be made of polyurethane cold foam. The polyurethane cold foam could be manufactured relatively inexpensively by, for example, a polycondensation of a polyether with a mixture of diphenyl methane diisocyanate (MDI) and toluene diisocyanate (TDI) (or toluene isocyanate). Such cold foam can provide a pronounced cushioning effect with only a relatively slight long-term decrease of the restoring capability, and relatively high air permeability.

According to another suitable embodiment, the foam piece may have a bulk density of about 25 to 65 kg/m$^3$, more suitably about 28 to 42 kg/m$^3$. According to an alternative embodiment, the foam piece may be polyurethane hot foam. The polyurethane hot foam can be produced, for example, by polycondensation of a polyether with toluene diisocyanate (TDI).

The foam piece can be manufactured according to a "one-shot" process to assist in optimizing energy efficiency. Such one-shot process includes mixing, polycondensation and foaming of at least one polyether with one isocyanate (e.g., toluene isocyanate) with the generally simultaneous use of a catalyst and a foam stabilizer. According to an alternative embodiment, at least one polyester may be used as the polyol and the isocyanate may be substituted or mixed with diphenyl methane diisocyanate (e.g., instead of or together with the polyether).

An insert or reinforcing section (shown as a reinforcement 5 in FIG. 1 having a curved or oblong shape) can be incorporated into pad 3. Reinforcement 5 may assist in ensuring an unreduced function with regard to the cushioning characteristics of pad 3, and an improved function with regard to the dimensional stability and optics. Reinforcement 5 may be relatively inexpensive to manufacture, since only slight need for post processing may exist after the foaming of pad 3. After the foaming of pad 3, a lasting connection between reinforcement 5 with pad 3 may occur, which may also hold during loading and deformation.

Positioning reinforcement 5 (or multiple reinforcing sections) in edge 6 of foam piece 4 may increase the dimensional stability of pad 3. Reinforcement 5 may be at least partially embedded in edge 6 by fixing reinforcement 5 in a forming mold 20 and surrounding it with foam. In FIG. 1, reinforcement 5 is shown schematically. Further details of reinforcement 5 are shown in FIGS. 2 and 3. As shown in FIG. 1, the linear or longitudinal dimension of reinforcement 5 is generally greater than, and preferably a multiple of, the lateral dimension of the cross section of reinforcement 5.

Reinforcement 5 may be arranged in edge 6 of foam piece 4 (e.g., primarily in the area of edge 6). This arrangement may allow reinforcement 5 to fully display its dimensionally stabilizing action, and to be embedded strongly enough in foam piece 4 due to the foam layer surrounding reinforcement 5. According to a suitable embodiment, the reinforcement may be arranged at a distance of about 3 to 25 mm from the surfaces forming edge 6, suitably about 7 to 15 mm. This is suitable for example in a motor vehicle with a relatively narrow seat and armrest (or seat back) to provide edge stability, which may be unstable without reinforcement.

Reinforcement 5 can be made of various materials (e.g., non-metallic materials). According to an exemplary embodiment as shown in FIG. 3, reinforcement 5 may be designed as a relatively coarse mesh carrier section (shown as a carrier 7). The mesh section of carrier 7 may be a textile relatively planar element. The textile may be surrounded by foam (e.g., a polyurethane foam). The textile of carrier 7 may be a woven fabric or a nonwoven fabric and be made of a plastic or of natural fibers.

Carrier 7 may be at least partially embedded in or attached to a&base foam piece (shown in FIG. 3 as a base 8). Base 8 may have a more or less pronounced cushioning effect than carrier 7. Base 8 may connect relatively easily to foam piece 4,due in part to a similar chemical composition and mechanical structure (for example the porous surface) between base 8 and foam piece 4. An end (shown as a U-shaped depending leg 9) may protrude downwardly from base 8 into foam piece 4. After the embedding of the reinforcement 5 in the foam piece 4 of pad 3, leg 9 may provide a connective and armoring function. According to a particularly preferred embodiment, the cross-section of base 8 is generally square shaped with curved edges. According to a particularly preferred embodiment, base 8 has a height H of about 5 to 15 mm, and base 8 has a width B of about 5 to 15 mm.

Base 8 of reinforcement 5 may be manufactured in substantially the same fashion as is described for the foam of foam piece 4. The foam of base 8 may have a relatively higher bulk density than the foam of foam piece 4, which may also involve a relatively higher hardness and flexible strength. According to a suitable embodiment, the base foam may have a bulk density of about 75 to 100 kg/m$^3$. According to an alternative embodiment, the reinforcement may be designed as a composite foam piece. The planar element of the carrier could have a planar density suitable for penetration of the foam and incorporation of the base foam, suitably a planar density of about 50 to 100 g/m$^2$, more suitably about 65 to 85 g/m$^2$.

Figure 5:
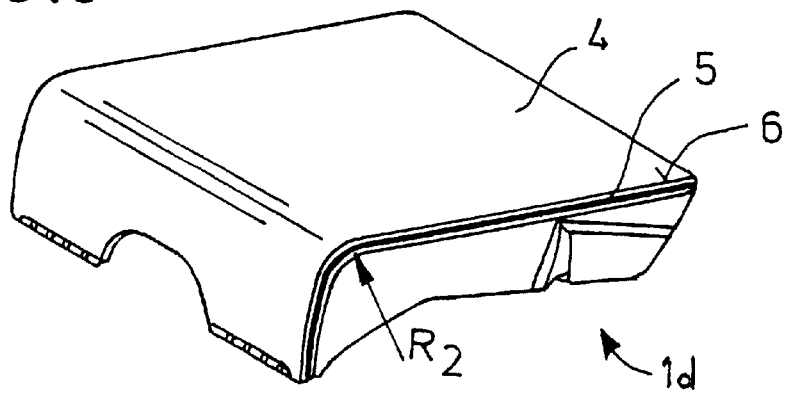
FIG. 5 is a perspective view of a padding element according to another alternative embodiment the present invention.

FIGS. 4 and 5 show seat elements 1c and 1d of a motor vehicle, alternative embodiments of seat elements 1a and 1b. Seat elements 1c and 1d differ from seat elements 1a and 1b in certain respects: FIG. 4 shows a padding element of a driver's seat; and FIG. 5 shows a padding element of a child seat addition that can be integrated onto a vehicle seat. Other than these differences, the construction, performance and function of seat elements 1c and 1d are substantially the same as seat elements 1a and 1b, and like reference numerals are used to identify like elements.

Reinforcement 5 may be designed with a relatively high degree of flexibility. Accordingly, it is possible that reinforcement 5 may be arranged in foam piece 4 following the contours of the edge 6, as well as in curves with relatively large radii (shown as radius $R^1$ in FIG. 4, greater than about 20 mm). Large radii $R^1$ may be advantageous with regard to the assembly in connection with the speed of the installation. It is also possible that reinforcement 5 may be arranged in curves with relatively small radii (shown as radius $R^2$ in FIG. 5, less than about 20 mm, suitably about 15 to 18 mm, which can be implemented in child seat addition 1d). Such arrangements do not necessarily require additional processing such as indenting or nicking.

Manufacture of the padding element (e.g., pad 3) may minimize the expenditure of energy as well as reduce the number of possible problems that may occur during the production of hot and cold foams. The padding element may be manufactured using a polyurethane cold foam with a bulk density of 85 to 90 kg/m$^3$. A polypropylene fabric with a planar density of about 75 g/m$^2$ may be embedded in the padding element as a carrier section (e.g., carrier 7). A foaming component such as Bayfit PU20WF62 Bayer (polyol) and Desmodur PU 3230 Bayer (isocyanate) may be used for manufacture of the foam. The foaming components may be put into a mixing head (at a ratio of about 2:1) under pressure (e.g., about 3.5 to 0.5 bar) and at room temperature (e.g., about 19 to 25° C.). The foaming components may be mixed at a speed of about 8000 RPM. The foaming components may be subsequently foamed in a continuous mold. The carrier section may be fed continuously (e.g. as a tape approximately 20 to 40 mm wide and 0.2 to 1.0 mm thick) into the mold. The textile planar element may be arranged as a generally U-shape leg (e.g., leg 9) when viewed in cross-section of the reinforcing section (e.g., reinforcement 5). See FIG. 3. The textile planar element may be arranged at least in stretches and in a manner advantageous with regard to the stability of the reinforcing section and the incorporation of the carrier section in a border area of the reinforcement. The ends of the leg may protrude from the base foam (e.g., base 8) after embedding the E reinforcing section in the foam piece (e.g., foam piece 4) of the padding element.

Figure 6:
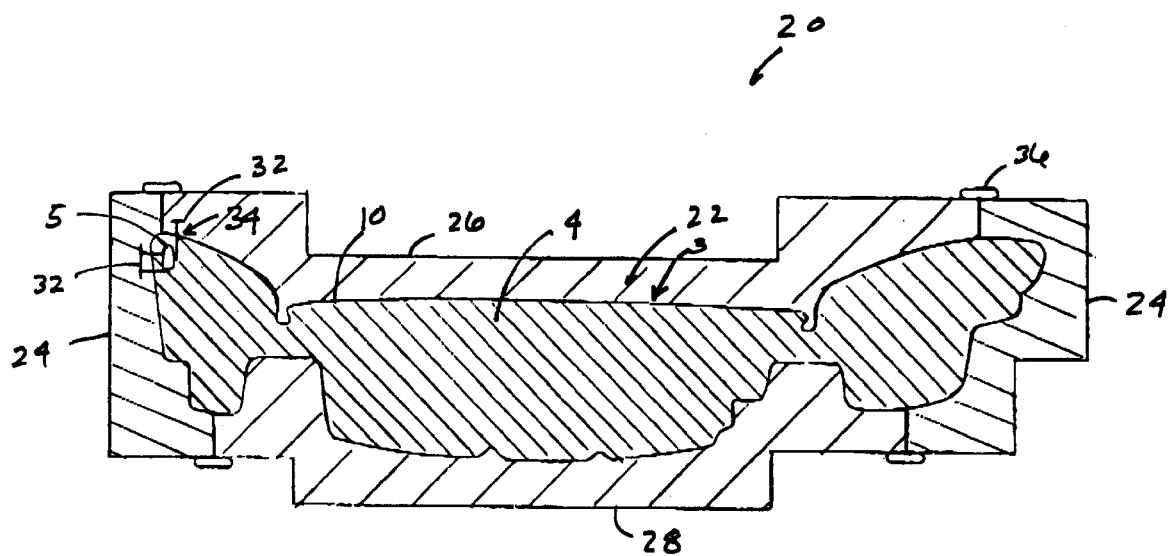
FIG. 6 is a sectional view of a forming mold and tool according to an exemplary embodiment of the present invention.

Referring to FIG. 6, pad 3 may be manufactured in forming mold 20 as a mold element or piece 22. Forming mold 20 may include a sidewall 24, a bottom or baseplate 26 and a cover 28. A fastener 36 may attach sidewall 24 to baseplate 26 and (over 28 to establish a relatively air-tight seal. Mold piece 22 may be positioned in forming mold 20. Reinforcement 5 may be at least partially embedded in edge 6 by fixing reinforcement 5 in forming mold 20 and surrounding it with foam. Reinforcement 5 (or carrier 7) may be clamped to at least one or more fasteners or brackets (shown as a clamp 32) of a form tool 30 in forming mold 20. Clamp 32 may be arranged at the bottom of mold 20, so that pad 3 may be subsequently foamed. After formation of pad 3, pad 3 can be removed or ejected from forming mold 20 cleanly and without substantial problems after the foaming (due to the arrangement of clamps 32 on the bottom of forming mold 20 and the clamp fitting). Pad 3 may have a residual mark or indentation (shown as an open slot 34) in foam piece 4 (e.g., on its "A" or seat surface 10) at an attachment location after ejection of mold piece 22, slot 34 may be formed because clamp 32 may have a width in the range of about 1.0 to 2.0 mm, suitably about 1.5 mm. Slot 34 may remain in mold piece 22 due to the possible foaming in clamp 32. Slot 34 does not have a substantial detrimental effect on pad 3 (e.g., the ready part).

The manufacture of pad 3 as a mold element (and/or positioning reinforcement 5 in forming mold 20) may reduce the need for subsequent processing or cutting to size of pad 3. The manufacture of pad 3 as mold piece 22 (and/or positioning of reinforcement 5 in forming mold 20) may also provide the possibility to foam reinforcement 5 uniformly from all sides in a desired position selected within padding element 3 (right from the beginning or inception of foaming).

In order to determine whether reinforcement 5 will come loose from foam piece 4, or possibly deforms permanently, pad 3 may be submitted to an endurance test according to DIN/EN/ISO 3385 with the following parameters as shown in TABLE 1.

TABLE 1

| | |
|---|---|
| Type of test: | force test |
| Minimum test: | O n |
| Maximum test: | 750 n |
| Frequency: | 1.17 hz |
| Stamp shape: | flat/round |
| Climatic conditions: | 23° C. and 50% relative air humidity (normal climate) |
| Stamping equipment: | planar onto the edge surface of the parts |
| Testing location: | x axis: centrally in the middle part<br>y axis: centrally on both sides |
| Testing base: | positive fit |

It would be suitable if few negative changes were determined in the pad after 80,000 strokes of the endurance test.

It is important to note that the construction and arrangement of the elements of the padding system and method in the preferred and other exemplary embodiments is illustrative only. Although only a few embodiments of the present invention have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, the carrier section may be manufactured differently with regard to material and geometry (e.g., not as a composite element, but of a uniform material). The carrier section may deviate from the cross section forms presented (e.g., a ring, cross, etc. shaped cross section). The foam may be a continuously manufactured block foam or a discontinuously manufactured foam. The block foam may be cut into padding elements with the desired form. Accordingly, all such modifications are intended to be included within the scope of the present invention as defined in the appended claims. Other substitutions, modifications, changes and omissions may be made in the design, operating conditions and arrangement of the preferred and other exemplary embodiments without departing from the spirit of the present invention as expressed in the appended claims.

What is claimed is:

1. A padding system for use in a vehicle comprising:
    a seat providing a pad comprising a first foam and having a border area along an edge portion thereof;
    at least one oblong reinforcing section embedded in the border area of the first foam; comprising:

a carrier made of a mesh of generally planar textile material;

a second foam comprising polyurethane at least partially surrounded by the carrier.

2. The padding system of claim 1 wherein the reinforcing section is an insert.

3. The padding system of claim 2 wherein the reinforcing section comprises a reinforcement.

4. The padding system of claim 3 wherein the carrier provides a generally U-shaped leg.

5. The padding system of claim 4 wherein the leg at least partially protrudes from the second foam.

6. The padding system of claim 4 wherein the first foam has a bulk density of about 25 to 65 kg/m$^3$.

7. The padding system of claim 6 wherein the second foam has a bulk density of about 75 to 100 kg/m$^3$.

8. The padding system of claim 6 wherein the first foam comprises a polyurethane foam.

9. The padding system of claim 6 wherein the second foam is flexible.

10. The padding system of claim 6 wherein at least one of the first foam and the second foam comprises a polyurethane cold foam.

11. The padding system of claim 6 wherein at least one of the first foam and the second foam comprises a polyurethane hot foam.

12. The padding system of claim 6 wherein the first foam has a bulk density of about 28 to 42 kg/M$^3$.

13. The padding system of claim 6 wherein the second foam has a bulk density of about 85 to 90 kg/m$^3$.

14. The padding system of claim 6 wherein the reinforcing section has a longitudinal dimension that is larger than a lateral dimension of a cross-section of the reinforcing section.

15. The padding system of claim 14 wherein the longitudinal dimension of the reinforcing section is a multiple of the lateral dimension of the cross-section of the reinforcing section.

16. The padding system of claim 15 wherein the reinforcing section is arranged in an edge area providing a surface forming an edge of the seat.

17. The padding system of claim 16 wherein the reinforcing section is arranged about 3 to 25 mm from the surface forming the edge.

18. The padding system of claim 17 wherein the reinforcing section is arranged about 7 to 15 mm from the surface forming the edge.

19. The padding system of claim 17 wherein the textile is at least partially arranged in the border area of the first foam.

20. The padding system of claim 19 wherein the textile material comprises a relatively coarse mesh material.

21. The padding system of claim 20 wherein the textile material has a planar density of about 50 to 100 g/m$^2$.

22. The padding system of claim 21 wherein the textile material has a planar density of about 65 to 85 g/m$^2$.

23. The padding system of claim 22 wherein the textile material comprises at least one of a woven fabric and a nonwoven fabric.

24. The padding system of claim 1 wherein the reinforcing section is flexible.

25. The padding system of claim 1 wherein the reinforcing section has an oblong profile.

26. The padding system of claim 1 wherein the reinforcing section has a curved profile.

27. The padding system of claim 1 wherein at least one of the first foam and the second foam is a polyurethane foam.

* * * * *